H. FRESH.
BRAKE.
APPLICATION FILED JULY 14, 1913.
1,110,767.
Patented Sept. 15, 1914.
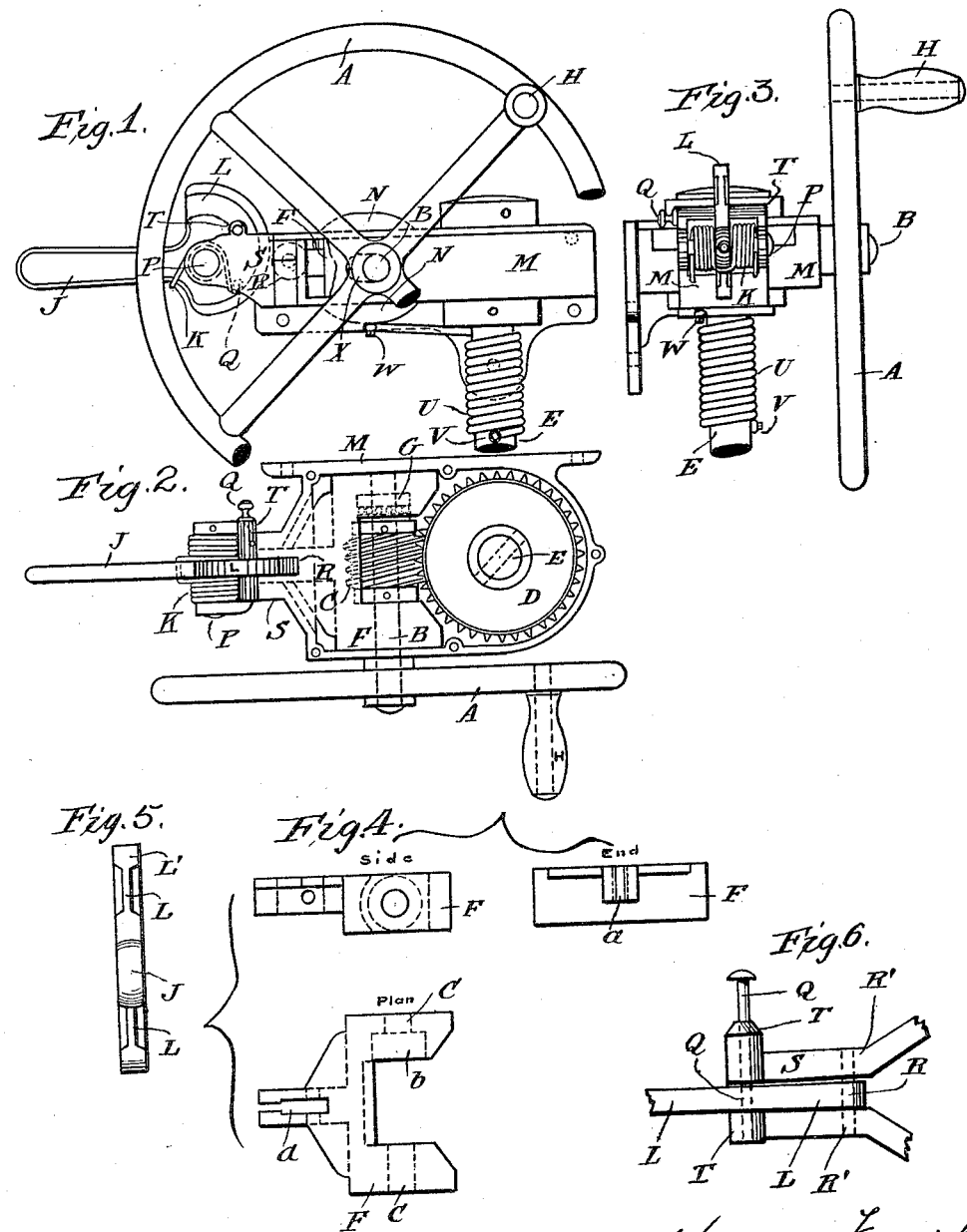
WITNESSES:
C. M. Catlin
Henry Fresh
INVENTOR.
By

UNITED STATES PATENT OFFICE.

HENRY FRESH, OF CUMBERLAND, MARYLAND.

BRAKE.

1,110,767. Specification of Letters Patent. Patented Sept. 15, 1914.

Application filed July 14, 1913. Serial No. 778,907.

*To all whom it may concern:*

Be it known that I, HENRY FRESH, a resident of Cumberland, in the county of Allegany and State of Maryland, have invented certain new and useful Improvements in Brakes; and I do hereby declare the following to be a full, clear, and exact description of the invention, such as will enable others skilled in the art to which it pertains to make and use the same.

This invention relates to worm-geared hand brakes of the type set forth in my patent, Number 1,035,340 dated August 13, 1912.

The object of the invention is to provide a simple and efficient construction of certain parts of the device, more particularly of the worm engaging and disengaging means; and of other parts.

The invention consists in the novel devices hereinafter described, and particularly pointed out in the claims.

In the accompanying sheet of drawing, which forms a part of the specification: Figures 1 and 3 are partial side elevations at right angles to each other, of the top part of the brake staff embodying features of the improvement; Fig. 2 is a plan view of the same; Fig. 4 comprises three parts which are respectively, side, end, and plan views of the novel movable worm bearing. Fig. 5 is an end view of the operating cam, on a larger scale than in Fig. 1; Fig. 6 is a partial plan view, also on a larger scale, showing a cam-locking device.

In the drawing, A denotes a hand wheel fixed to a short transverse shaft, B, on which is secured a worm, C; D denotes a gear wheel fixed to a brake staff, E, at or near its top, said wheel being adapted to coöperate with the movable worm C; F denotes a movable bearing for the worm shaft or spindle. (See Figs. 2 and 5.)

G denotes an abutment collar on the worm spindle, B, for thrust bearing balls, as shown.

H is a handle for the hand wheel.

The movable bearing F comprises in a single casting a channel like body in the side members of which are bearings, c, for the worm spindle, and a recess, b, for the thrust balls above referred to. It also comprises a forward central extension to support an operating cam, J, which consists of a thin web, L, having a thicker operating rim L'. Said rim is of suitable size and shape to move the worm bearing F, to carry the worm out of engagement with the wheel, or to permit reëngagement of the worm and wheel. The thin web of this cam moves in the outer narrow end of the slot, and the rim bears against an anti-friction roller R rotatably mounted, and concealed within the bearing extension, except where it projects into slot $a$ into the range of movement of the cam.

R' denotes bearings for the roller shaft. Between the part $a$ of the slot, and the narrower part thereof, are shoulders against which the cam-rim acts to draw the worm out of engagement.

M is a case for the worm, gear wheel, and bearings, and N, N, are housings over the worm.

P denotes the cam spindle, and Q a locking pin for the cam.

S is a bracket on the case M, to hold the bearing of the cam spindle P; T is a boss on said bracket to receive the cam-locking pin Q. Said bracket S has an arm on either side of the cam, and on each arm is a fixed hollow boss or sleeve T. The pin Q is slidably mounted in one of these sleeves and adapted to pass from the same through a suitable hole 2 in the cam web and into the sleeve on the other side thereof, thus locking the cam. Withdrawing the pin from the web unlocks the cam.

On the brake shaft is a torsion spring, U, attached at V and W to the case and to the staff.

X are elongated slots in the case M to allow the worm spindle to move with the bearing F, to engage or disengage the worm and gear.

The worm is normally held in engagement by the spring K, coiled on the cam shaft. The cam when operated draws the worm away from the gear to the desired extent, and takes up all lost motion caused by wear or strain. Reverse movement of the cam under action of the torsion spring K, when the cam-handle is released, acts through roller R to carry the worm into engagement. When handle H is released, the torsion spring U, throws the brake staff reversely.

Having described my invention, what I claim and desire to protect by Letters Patent is—

1. In combination, a brake staff, a gear wheel thereon, a worm, a movable bearing for the worm, an operating cam therefor, and a roller on which the cam acts to move the worm bearing and worm.

2. In combination, a brake staff, a gear wheel thereon, a worm, a movable bearing for the worm, a pivoted cam, and a coiled spring on the cam shaft tending to hold the cam in normal position or to return it to such position.

3. A brake-worm bearing comprising side members with shaft openings, an extension with a cam receiving slot, an anti-friction roller, there being also bearings to hold the shaft of the roller so that the roller will project into said slot.

4. In combination, a brake staff, a gear wheel thereon, an operating worm therefor, a bearing for the worm comprising a member having a slot narrow at its outer end and wider at its inner end, forming intermediate lugs or shoulders to engage the back of the rim of the operating cam to draw the worm from the wheel for disengagement.

5. In combination, a brake staff, a gear wheel, a worm, an operating cam, a torsion spring operating on the cam to automatically reëngage the worm and gear and to continuously force the cam against the opposing member thereby preventing lost motion and taking up wear.

In testimony whereof, I have signed this specification in the presence of two subscribing witnesses.

HENRY FRESH.

Witnesses:
M. J. MULLANY,
THOS. A. LEONARD.

---

Copies of this patent may be obtained for five cents each, by addressing the "Commissioner of Patents, Washington, D. C."